(12) United States Patent
Tarandek et al.

(10) Patent No.: US 11,994,182 B2
(45) Date of Patent: May 28, 2024

(54) ELECTRO-MECHANICAL BRAKE

(71) Applicant: HL MANDO CORPORATION, Gyeonggi-do (KR)

(72) Inventors: Kristijan Tarandek, Neu-Isenburg (DE); Hans-Jörg Feigel, Rosbach (DE); I-Che Chiang, Frankfurt am Main (DE)

(73) Assignee: HL MANDO CORPORATION, Gyeonggi-Do (KR)

(*) Notice: Subject to any disclaimer, the term of this patent is extended or adjusted under 35 U.S.C. 154(b) by 420 days.

(21) Appl. No.: 17/215,707

(22) Filed: Mar. 29, 2021

(65) Prior Publication Data
US 2021/0310530 A1    Oct. 7, 2021

(30) Foreign Application Priority Data
Apr. 3, 2020 (DE) .......................... 102020204393.0

(51) Int. Cl.
| *F16D 55/227* | (2006.01) |
| *F16D 65/18* | (2006.01) |
| *F16D 65/56* | (2006.01) |
| *F16D 121/24* | (2012.01) |
| *F16D 125/36* | (2012.01) |
| *F16D 125/50* | (2012.01) |

(52) U.S. Cl.
CPC .......... *F16D 65/18* (2013.01); *F16D 55/227* (2013.01); *F16D 65/567* (2013.01); *F16D 2121/24* (2013.01); *F16D 2125/36* (2013.01); *F16D 2125/50* (2013.01)

(58) Field of Classification Search
CPC ...... F16D 65/18; F16D 55/227; F16D 65/567; F16D 2121/24; F16D 2125/36; F16D 2125/50
See application file for complete search history.

(56) References Cited

U.S. PATENT DOCUMENTS

| 4,598,801 | A | * | 7/1986 | Villata | .................. | F16D 65/567 |
| | | | | | | 188/71.9 |
| 6,311,807 | B1 | * | 11/2001 | Rinsma | ................. | F16D 65/567 |
| | | | | | | 188/71.9 |

(Continued)

FOREIGN PATENT DOCUMENTS

WO    WO-9902885 A1 *    1/1999 ............. F16D 65/18

*Primary Examiner* — Nicholas J Lane
(74) *Attorney, Agent, or Firm* — Ladas & Parry, LLP

(57) ABSTRACT

The invention relates to an electro-mechanical brake with an actuator (5) for pressing at least one brake pad (3, 4) against a rotating friction surface. The actuator (5) comprises an electric motor (7) and a first transmission for converting a rotary motion of the electric motor (7) into a translational motion of the at least one brake pad (3, 4) for activating or releasing the electromechanical brake. Furthermore, the actuator (5) comprises a second transmission for converting a rotary motion of the same electric motor (7) into a further translational motion of the at least one brake pad (3, 4) to compensate for a wear of the at least one brake pad (3, 4), the first transmission and the second transmission being coupled so that the translational motion of the at least one brake pad (3, 4) caused by the first transmission and the further translational motion of the at least one brake pad (3, 4) caused by the second transmission add up to a resulting translation of the at least one brake pad (3, 4).

12 Claims, 15 Drawing Sheets

(56) References Cited

U.S. PATENT DOCUMENTS

| | | | |
|---|---|---|---|
| 11,649,866 B2* | 5/2023 | Tarandek | F16D 55/226 |
| | | | 188/71.9 |
| 2019/0242449 A1* | 8/2019 | Berwanger | F16D 65/567 |
| 2020/0062230 A1* | 2/2020 | Henning | F16D 65/18 |
| 2021/0222746 A1* | 7/2021 | Tarandek | F16D 55/2262 |
| 2021/0300310 A1* | 9/2021 | Gerber | F16D 55/226 |
| 2021/0301889 A1* | 9/2021 | Gerber | B60T 13/746 |
| 2021/0301892 A1* | 9/2021 | Gerber | B60T 13/741 |
| 2021/0310531 A1* | 10/2021 | Tarandek | F16D 65/567 |

\* cited by examiner

ELECTRO-MECHANICAL BRAKE

CROSS-REFERENCE TO RELATED APPLICATIONS

This application claims the priority to German Patent Application No. 102020204393.0 filed on Apr. 3, 2020, the entire contents of which is incorporated herein by reference.

The invention relates to an electro-mechanical brake with an actuator for pressing at least one brake pad against a rotating friction surface.

The actuator of such an electro-mechanical brake comprises an electric motor and a transmission for converting a rotary motion of the electric motor into a translational motion of the at least one brake pad for activating or releasing the electro-mechanical brake. Electro-mechanical brakes of this type are known from the prior art and can be used, for example, as parking brakes or as service brakes of a vehicle.

A problem associated with brakes of this kind is that an increasing wear of the at least one brake pad needs to be compensated for by increasing a stroke of the actuator or by otherwise adjusting a play of the brake.

It is an object of the present invention to provide an electro-mechanical brake allowing for a pad wear compensation by keeping its actuator and structure as small, light and efficient as possible.

According to the invention, this is achieved by an electro-mechanical brake according to the independent claims. Optional features of such a brake are defined in the dependent claims and described further below.

The suggested electro-mechanical brake has an actuator for pressing at least one brake pad against a rotating friction surface, the actuator comprising an electric motor as well as a first transmission for converting a rotary motion of the electric motor into a translational motion of the at least one brake pad for activating or releasing the electro-mechanical brake. According to the invention, the actuator further comprises a second transmission for converting a rotary motion of the same electric motor into a further translational motion of the at least one brake pad to compensate for a wear of the at least one brake pad, the first transmission and the second transmission being coupled so that the translational motion of the at least one brake pad caused by the first transmission and the further translational motion of the at least one brake pad caused by the second transmission add up to a resulting translation of the at least one brake pad.

This has the effect the first transmission can be designed efficiently for its purpose of causing the translational motion needed for activating and releasing the brake while it does not need to be able to compensate for the pad wear. In particular, a maximum stroke of the first transmission can be restricted to a relative small for this reason. This helps keeping an overall length of the actuator small. At the same time, a number and weight of additional components can be restricted to a minimum as the second transmission is driven by the same electric motor so that no additional actuator is needed.

The electro-mechanical brake can be used as a service brake and/or as a parking brake. Typically, it is a disc brake comprising a brake disc and two brake pads, each of them for pressing against one of two friction surfaces, the actuator being part of or fixed to a calliper of the disc brake. Instead, it could also be a drum brake. In this case, the brake pad or each of the brake pads would be a brake shoe of the drum brake.

In some embodiments, the actuator may comprise at least two pushing pins for pushing against the brake pad or against one of the brake pads, wherein the first transmission is configured for converting a rotary motion of the electric motor into a translational motion of the pushing pins and wherein the second transmission is an adjustment mechanism for adjusting a variable length of the pushing pins to the wear of the at least one brake pad. To this end, the adjustment mechanism may comprise a mechanism for converting a rotational motion of a rotary part of each of the pushing pins into a length variation of the pushing pins as well as at least one elastic arm arranged at an outer rim of a rotating part of the first transmission to engage with a pinion provided at the rotary part of at least one of the pushing pins.

Typically, each of the pushing pins will be provided with a pinion at its rotary part and that the adjustment mechanism comprises an elastic arm for each of the pushing pins, the elastic arms being arranged at the outer rim of the rotating part of the first transmission to engage with the pinion of the respective pushing pin. This, however, is not necessary. Alternatively, the rotating parts of the pushing pins could cinematically be coupled to be rotated together, e.g. by means of one or more gear wheels.

The elastic arm or each of the elastic arms can be arranged so that it does not engage with the pinion of the respective pushing pin or with any of the pinions of the pushing pins if the said rotating part is rotated within an interval of rotation angles corresponding to a normal operation of the electro-mechanical brake. This prevents an inadvertent activation of the adjustment mechanism and makes sure that the adjustment mechanism does not impede the normal operation of the brake.

In this case, the elastic arm can be arranged so that it may engage with the pinion of the respective pushing pin if the rotating part is rotated in a range of rotation angles lying beyond a limit of the said interval in a direction of rotation corresponding to a release of the electro-mechanical brake. The effect is that the adjustment mechanism can be operated by rotating the said rotating part beyond the limit of its usual interval of rotation angles using the same electric motor.

The elastic arm can be arranged to drive the rotary part of the respective pushing pin for increasing the length of the pushing pin if the elastic arm is engaged with the pinion of the pushing pin and if the rotating part of the first transmission is rotated in a first direction, while the elastic arm can advantageously be configured to slide over the pinion of the pushing pin without rotating the rotary part of the pushing pin if the elastic arm contacts the pinion during a rotation of the rotating part in a reverse direction. Typically, the first direction is the direction of rotation of the rotating part corresponding to a release of the electro-mechanical brake, while the reverse direction is a direction of rotation of the rotating part corresponding to an activation of the electro-mechanical brake.

The adjustment mechanism may comprise at least one further elastic arm arranged at the outer rim of the said rotating part of the first transmission to engage with the pinion provided at the rotary part of at least one of the pushing pins, the further elastic arm being arranged so that it does not engage with the pinion of the respective pushing pin or with any of the pinions of the pushing pins if the said rotating part is rotated within the said interval of rotation angles corresponding to the normal operation of the electro-mechanical brake, while it may engage with the pinion of the respective pushing pin if the rotating part is rotated in the said range of rotation angles lying beyond the said limit of the said interval, wherein the further elastic arm is arranged to drive the rotary part of the respective pushing pin for reducing the length of the pushing pin if the further elastic arm is engaged with the pinion of the pushing pin and if the rotating part of the first transmission is rotated in the said reverse direction, while the further elastic arm is configured to slide over the pinion of the pushing pin without rotating the rotary part of the pushing pin if it contacts the pinion during a rotation of the rotating part in the first direction. Typically, the adjustment mechanism comprises a further elastic arm of this kind for each of the pushing pins to engage with the pinion of the respective pushing pin for reducing its length as described. This further elastic arm or these further elastic arms can be used for reversing or undoing any adjustments made to compensate for the pad wear, in particular if a used and worn brake pad is replaced with a new brake pad having an unused and, thus, thicker brake lining. The reversing or undoing of the earlier adjustments can, in this case, also be made by means of the same electric motor and the second transmission.

Each of the pushing pins may have a screw thread as a constituent of the adjustment mechanism, a nut or a lead screw of the screw thread being given by or being part of the said rotary part of the pushing pin. In alternative embodiments, ball screws could be used instead of ordinary screw threads.

The first transmission may comprise a reduction gear for converting a rotational speed of a shaft of the electric motor and thereby increasing an available torque. This helps keeping the electric motor small and light. The reduction gear may, for example, comprise a toothed belt drive and/or a planetary gear.

For converting an output of the electric motor or of the reduction gear into the translational motion, the first transmission may comprise, for example, a ball ramp mechanism. The ball ramp mechanism may comprise a fixed plate, a rotating plate and balls arranged between the fixed plate and the rotating plate for rolling in ramp grooves provided in a surface of the fixed plate and in a surface of the rotating plate. In this case, the said rotating part can be, for example the said rotating plate of the ball ramp mechanism or a part connected to the said rotating plate.

The electro-mechanical brake may further comprise a position sensor for detecting a position of the electric motor and/or of the first transmission as well as a control unit for controlling the electric motor to drive the second transmission. The control unit may be configured for determining a free play of the electro-mechanical brake due to an increased wear of the at least one brake pad by detecting a dependence between an output torque and/or a power consumption of the electric motor and the position detected by the position sensor. Furthermore, the control unit may be configured for controlling the electric motor to drive the second transmission for reducing the free play to compensate for the increased wear if the determined free play is larger than a given threshold value.

An exemplary embodiment of the invention is shown in the Figures and described here below.

FIG. 1 shows a perspective view of an electro-mechanical brake including a brake disc, a calliper, two brake pads and an actuator.

FIG. 2 perspectively shows a part of the same brake with the calliper of being omitted.

Figure 6:
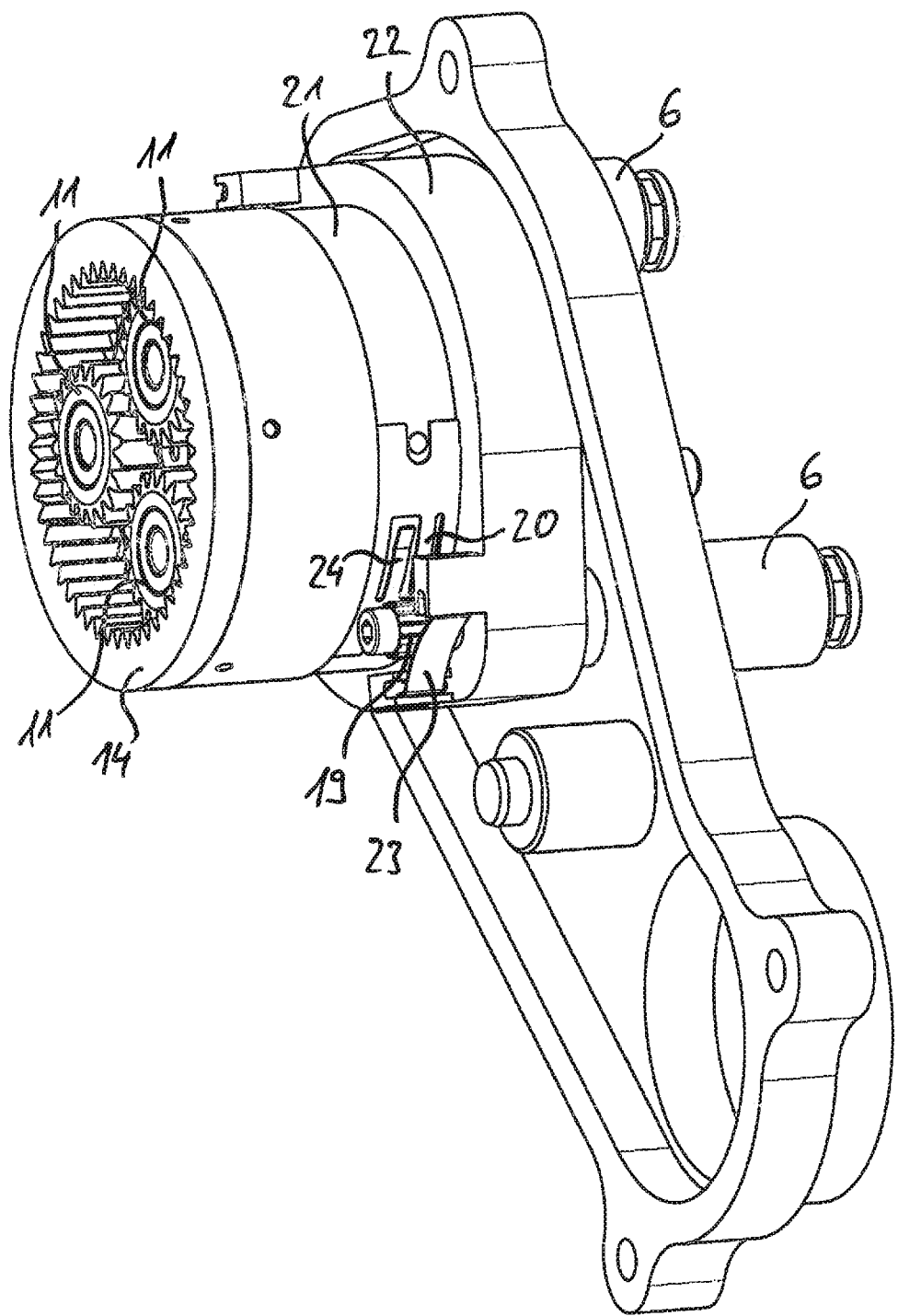

FIG. 6 shows a perspective view of a part of the actuator including parts of a first transmission for converting a rotary motion of an electric motor of the actuator into a translational motion of the brake pads for activating or releasing the brake as well as a second transmission for converting a rotary motion of the same electric motor into a further translational motion of the brake pads to compensate for a pad wear.

Figure 7:
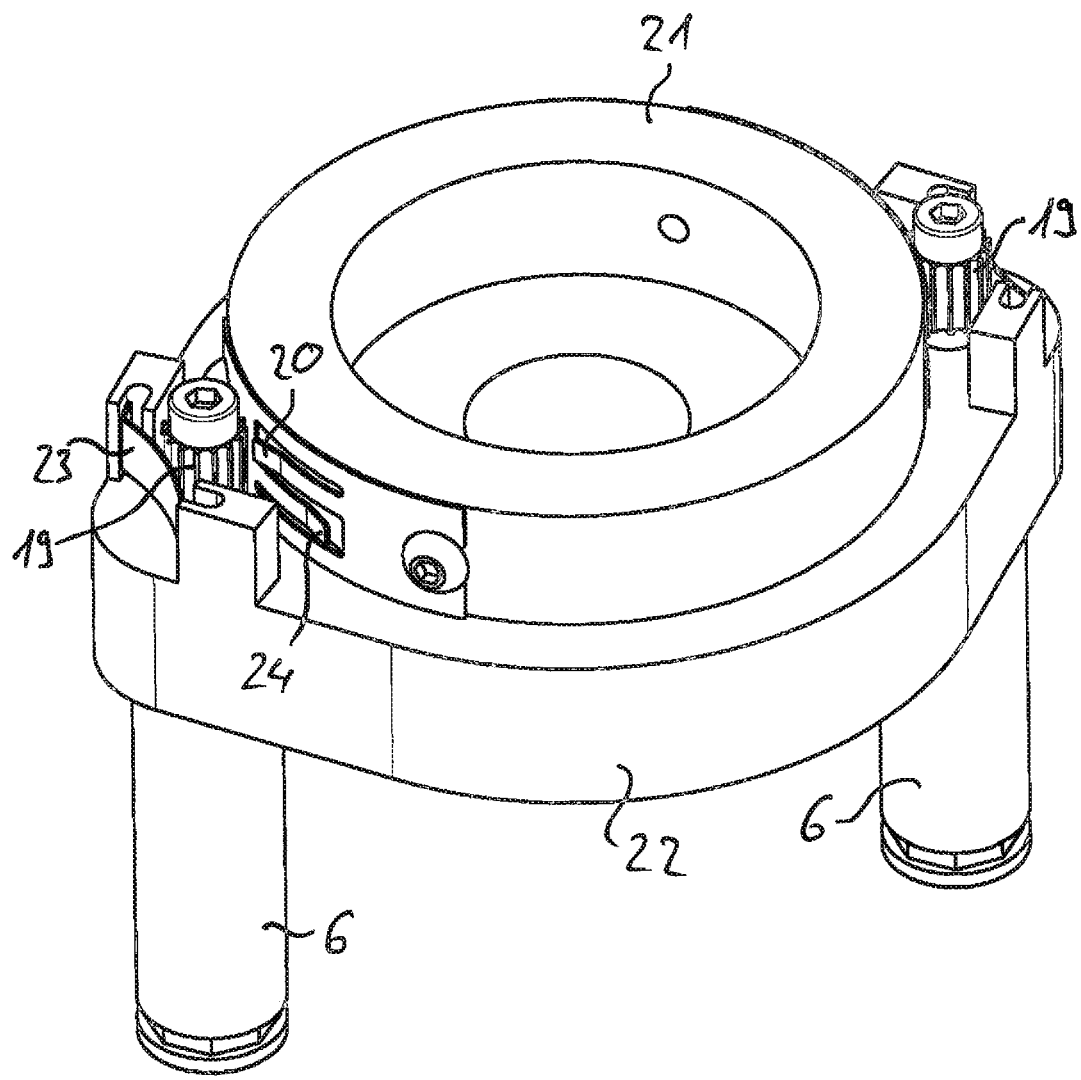

FIG. 7 shows a perspective view of the second transmission.

Figure 8:
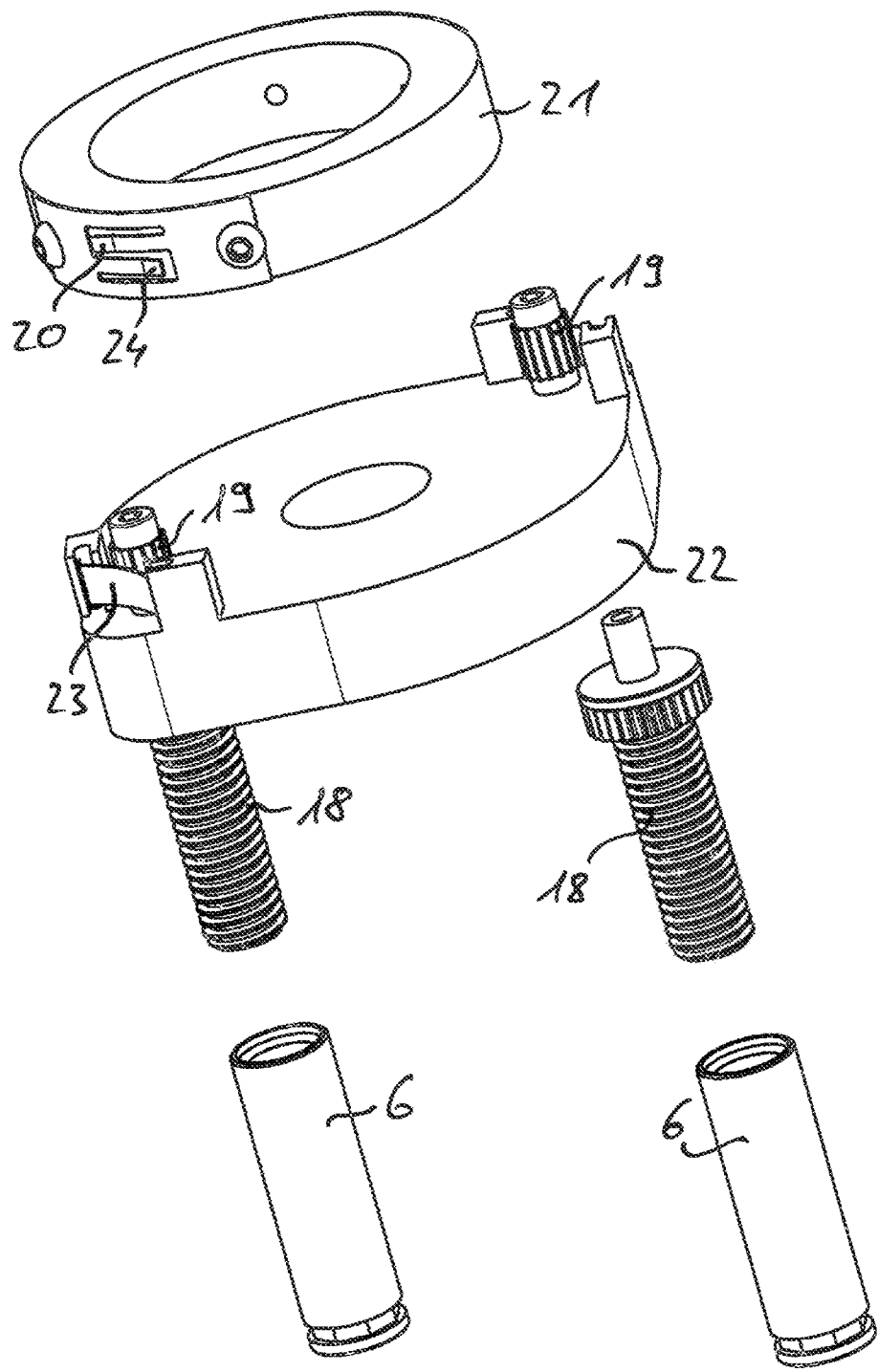

FIG. 8 is an exploded-view drawing of the same second transmission.

FIGS. 9-12 show side-views of the second transmission in different stages of a motion corresponding to an adjustment of the brake to an increased wear of the brake pads.

Figure 13:
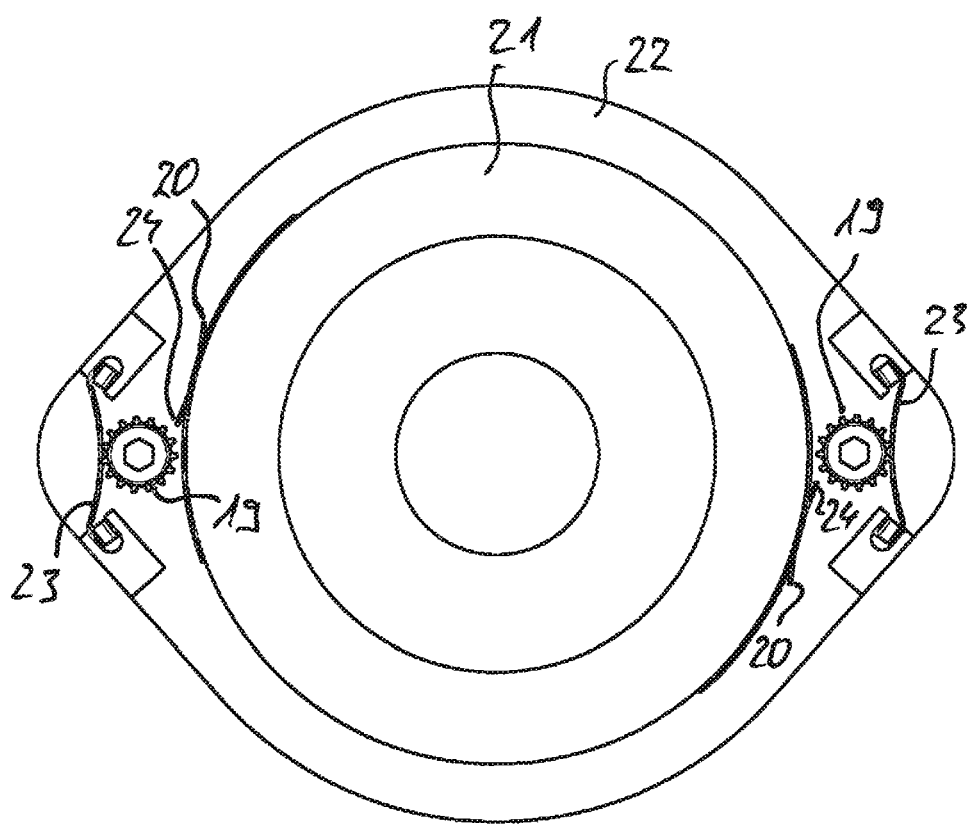
Figure 14:
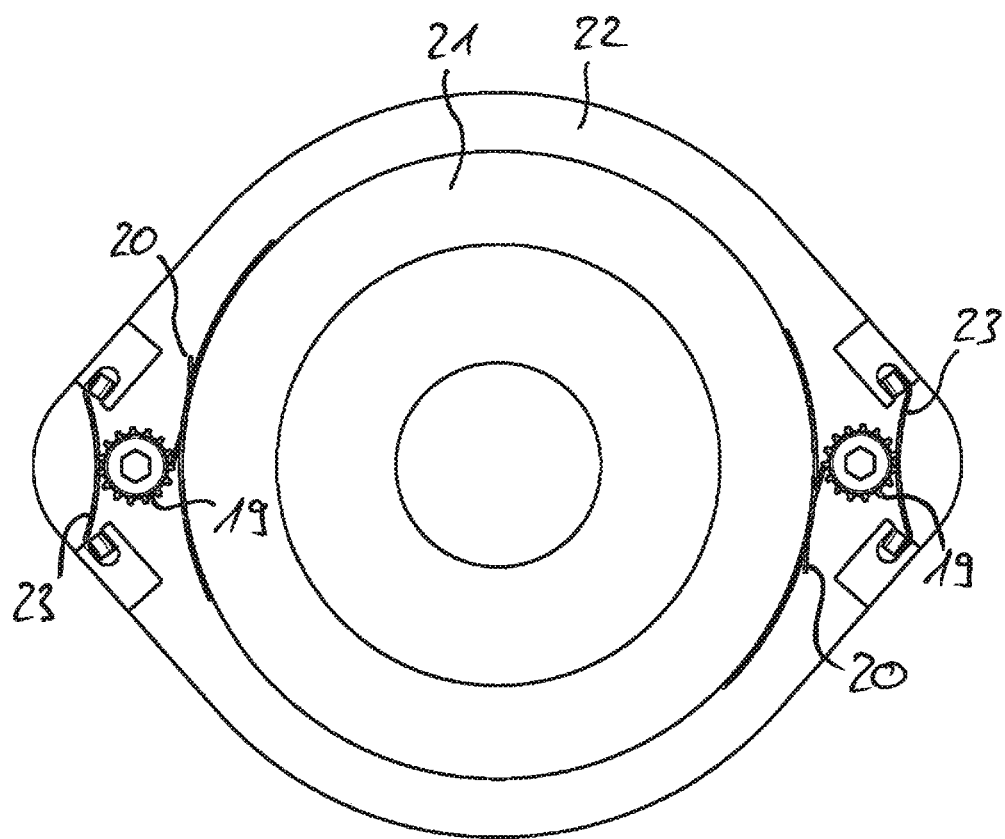
Figure 15:
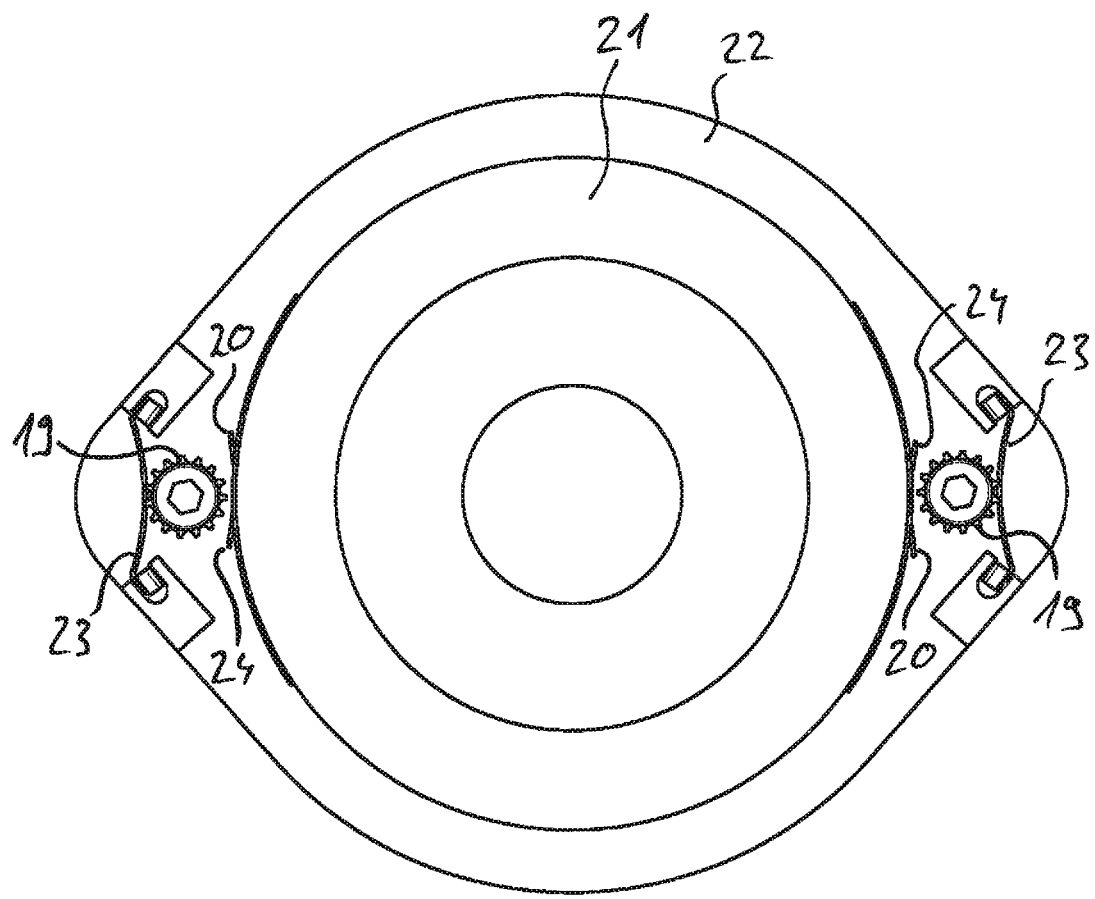

FIGS. 13-15 show side-views of the second transmission in different stages of an operation performed for reversing or undoing the adjustment if used brake pads are replaced with new brake pads.

Figure 1:
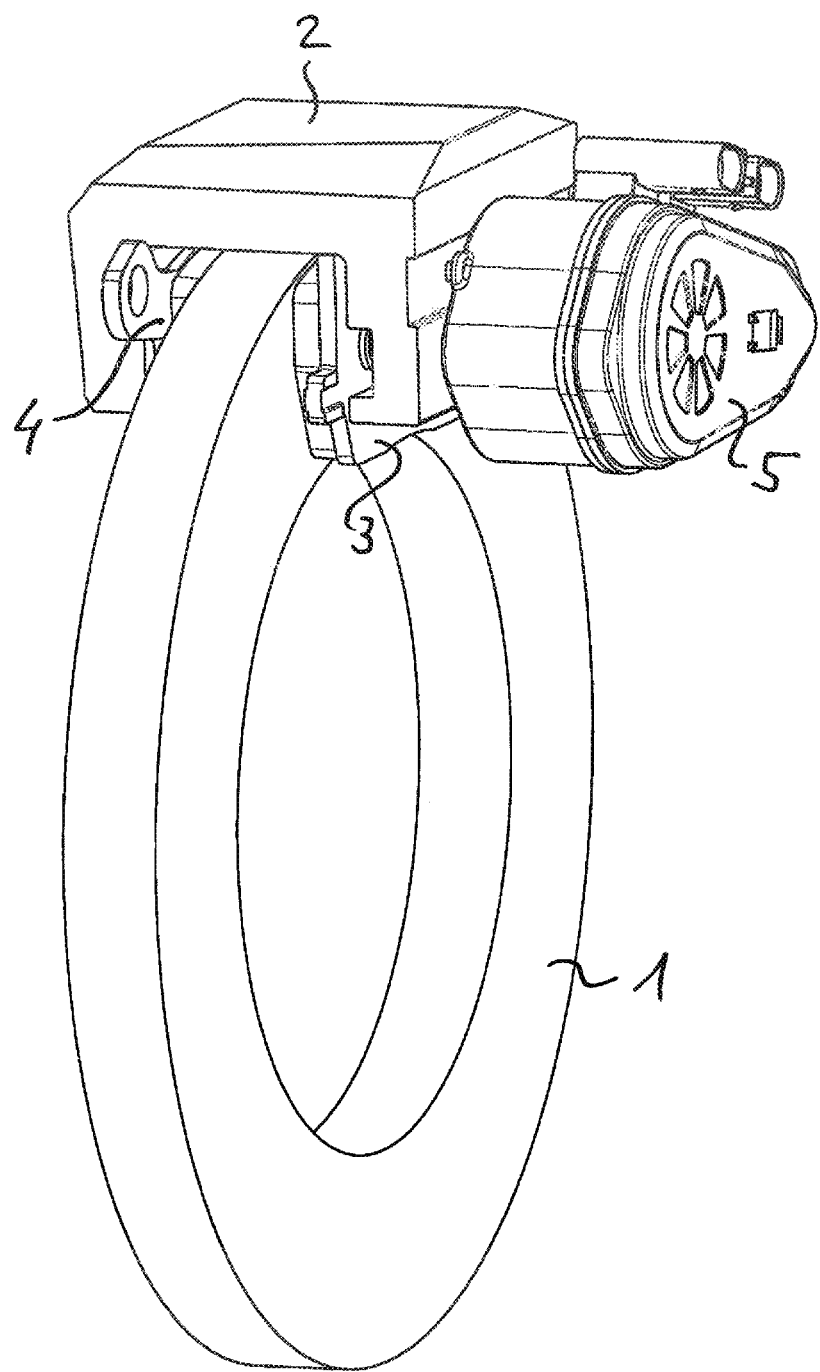
Figure 2:
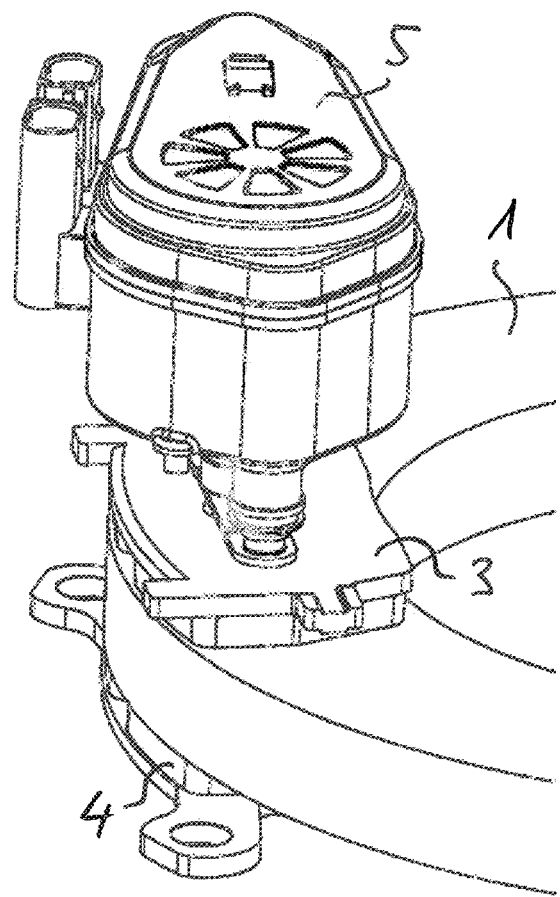

FIG. 1 shows an electro-mechanical brake being a disc brake. This electro-mechanical brake can be used as a service brake and as a parking brake of a vehicle. The electro-mechanical brake includes a brake disc 1, a calliper2, a first brake pad 3, a second brake pad 4 and an actuator 5 for pressing the brake pads 3 and 4 against rotating friction surfaces of the brake disc 1. The first brake pad 3 is directly pushed against a first friction surface of the brake disc 1 by the actuator 5, while the second brake pad 4 is pressed from an opposite side against a second friction surface of the brake disc by means of the same actuator 5 and the calliper 2, to which the actuator 5 is firmly connected. FIG. 2 shows the same brake without the calliper 2 so that the two brake pads 3 and 4 can better be seen. Each of the brake pads 3 and 4 has a back plate and a brake lining, the back plate being pushed by the actuator 5 or, in case of the second brake pad 4, by fingers of the calliper 2.

Figure 3:
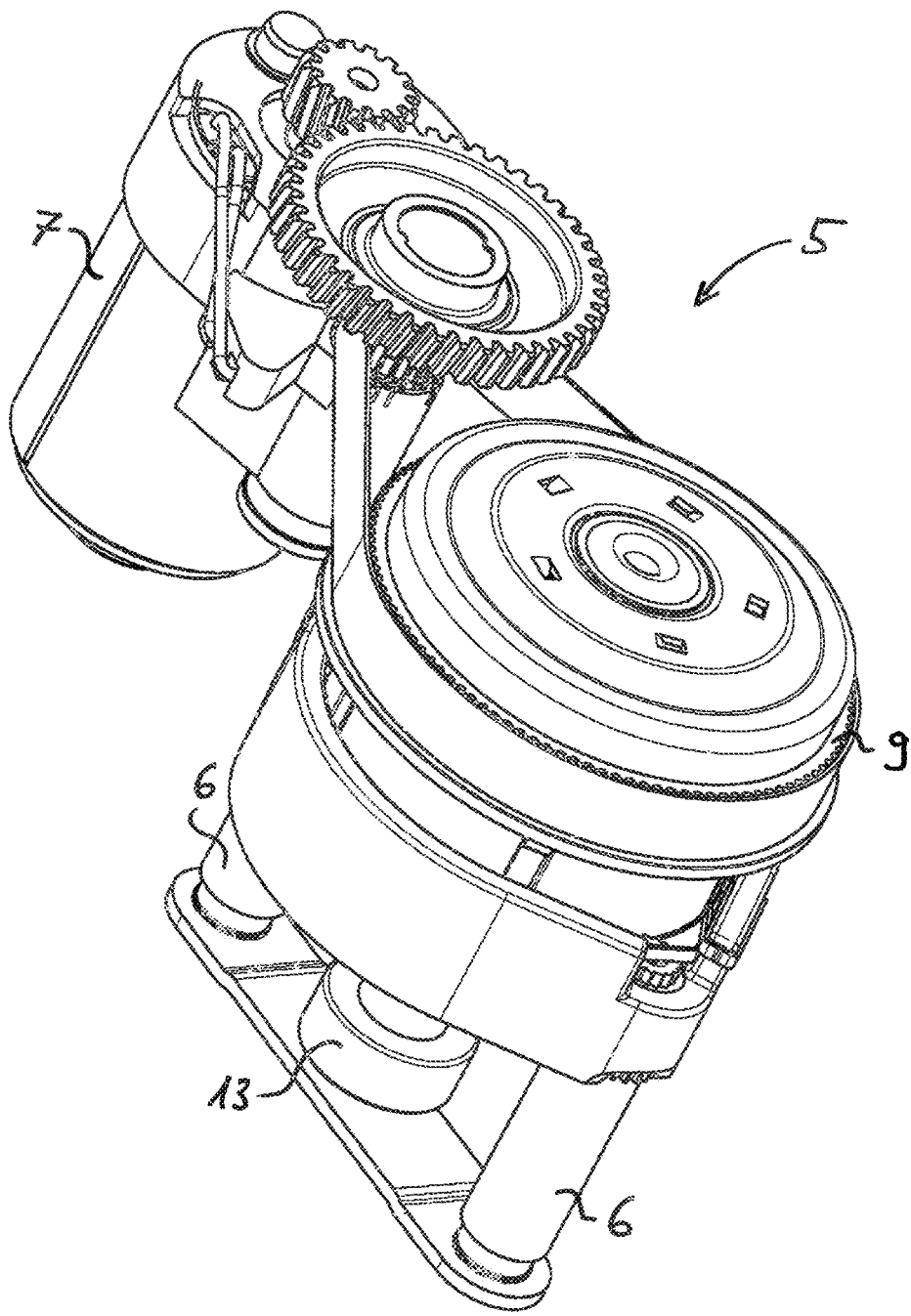
FIG. 3 shows a perspective view of the actuator of the electro-mechanical brake, a housing of the actuator being omitted.

In all Figures, the same features are indicated using the same reference signs. FIG. 3 shows the actuator 5 without a housing of the actuator 5. The actuator 5 comprises two pushing pins 6 for pushing against the first brake pad 3, an electric motor 7 and a first transmission for converting a rotary motion of the electric motor 7 into a translational motion of the brake pads 3 and 4 for activating or releasing the electro-mechanical brake. The first transmission does so by converting the rotary motion of the electric motor 7 into a translational motion of the pushing pins 6.

The first transmission comprises a multiple-stage reduction gear for converting a rotational speed of an output shaft of the electric motor 7, the reduction gear comprising a toothed belt drive with a toothed belt 8 and a planetary gear, the planetary gear being driven by a gear wheel 9 of the toothed belt drive.

Figure 4:
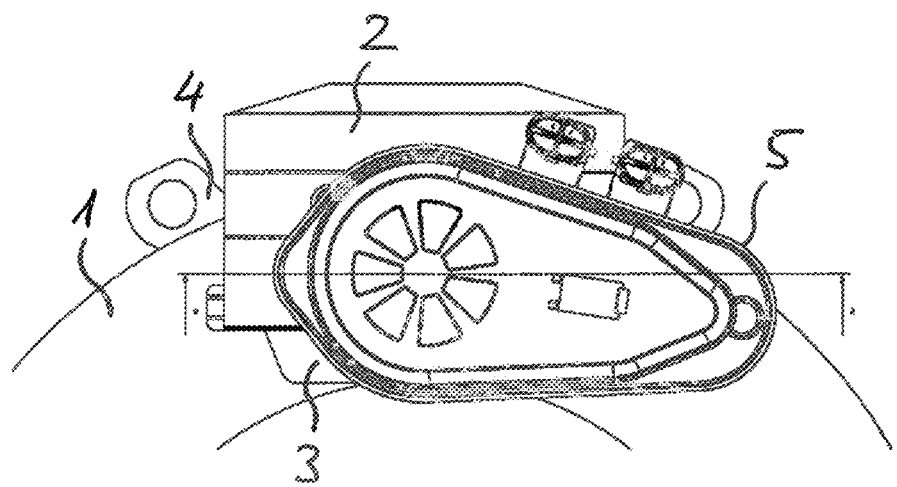
FIG. 4 shows a side view of the same actuator as well as of the calliper and a part of the brake disc.
Figure 5:
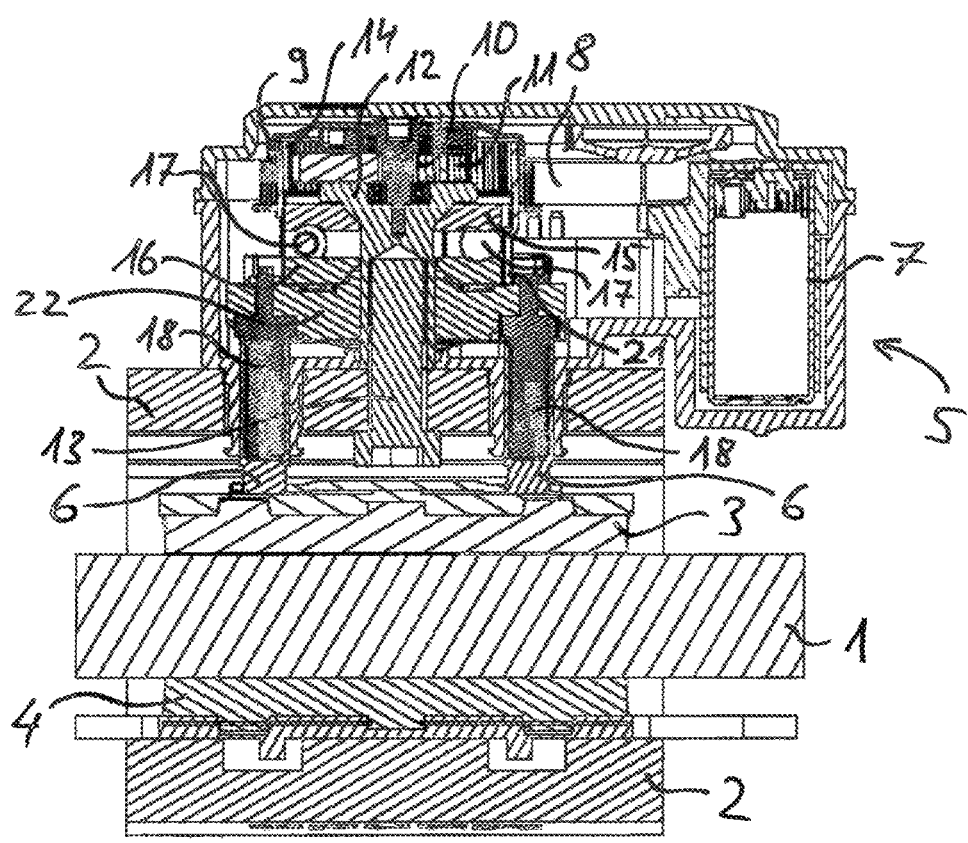
FIG. 5 shows a cross section of the electro-mechanical brake, cut in a plane indicated as A-A in FIG. 4.

FIG. 5 shows a cross section of the electro-mechanical brake including the actuator 5, a side-view of which is shown in FIG. 4. Further details of the actuator 5 are shown in FIGS. 6, 7 and 8 and described here below. Again, the same features are indicated using the same reference signs. The gear wheel 9 is directly connected to a sun wheel 10 of the planetary gear. Planetary wheels 11 of the planetary gear have axles mounted to a torque-proof carrier 12. By means of a bolt 13, the carrier 12 of the actuator 5 is firmly connected to the calliper 2. Finally, the planetary gear comprises a ring gear 14 which is driven by the sun wheel 10 via the planetary wheels 11.

For converting a rotation of the ring gear 14 into a translational motion, the first transmission comprises, in this example, a ball ramp mechanism. The ball ramp mechanism comprises a fixed plate 15 firmly connected to the carrier 13, a rotating plate 16 which is connected to and driven by the ring gear 14, and balls 17 arranged between the fixed plate 15 and the rotating plate 16 for rolling in ramp grooves provided in surfaces of the fixed plate 15 and of the rotating plate 16 facing each other. When the rotating plate 16 is rotated in a first direction, a distance between the rotating plate 16 and the fixed plate 15 is reduced so that the brake pads 3 and 4 are retracted and the electro-mechanical brake is released. When the rotating plate 16 is rotated in a reverse direction, a distance between the rotating plate 16 and the fixed plate 15 is increased and the brake pads 3 and 4 pushed against the brake disc so that the electro-mechanical brake is activated.

The actuator 5 further comprises a second transmission for converting a rotary motion of the electric motor 7 into a further translational motion of the brake pads 3 and 4 to compensate for a wear of the brake pads 3 and 4. The second transmission is an adjustment mechanism for adjusting a variable length of the pushing pins 6 to the wear of the brake pads 3 and 4. To this end, each of the pushing pins 6 includes a rotary part 18 and a mechanism for converting a rotational motion of the rotary part 18 into a length variation of the respective pushing pin 6. These mechanisms are part of the second transmission. Each of the pushing pins 6 is provided with a pinion 19 at its rotary part 18. Furthermore, the adjustment mechanism comprises elastic arms 20, one of the elastic arms 20 being provided for each of the pushing pins 6. The elastic arms 20 are arranged at an outer rim of a rotating part 21 of the first transmission to engage with the pinion 19 provided at the rotary part 18 of the respective pushing pin 6. The rotating part 21 can be identical with or firmly connected to the rotating plate 16 of the ball ramp mechanism.

As can be seen in FIG. 8, the mechanisms for converting a rotational motion of the rotary parts 18 into a length variation of the pushing pins 6 are given by screw threads, the rotary parts 18 forming lead screws of the screw threads, while nuts of the screw thread are remaining parts of the pushing pins 6.

The carrier 12 of the actuator 5 is surrounded by a bearing plate 22 holding the pushing pins 6 and supporting the rotating plate 16 of the ball ramp mechanism, the bearing plate 22 being slidably engaged with the carrier 12.

As is apparent from FIGS. 5 to 8 and the above description, the first transmission and the second transmission or adjustment mechanism are coupled so that a translational motion of the brake pads 3 and 4 caused by the first transmission and a further translational motion of the brake pads 3 and 4 caused by the second transmission or adjustment mechanism add up to a resulting translation of the two brake pads 3 and 4.

An operation of the adjustment mechanism for adjusting for the variable length of the pushing pins 6 to an increased wear of the brake pads 3 and 4 is illustrated in FIGS. 9 to 12.

Figure 9:
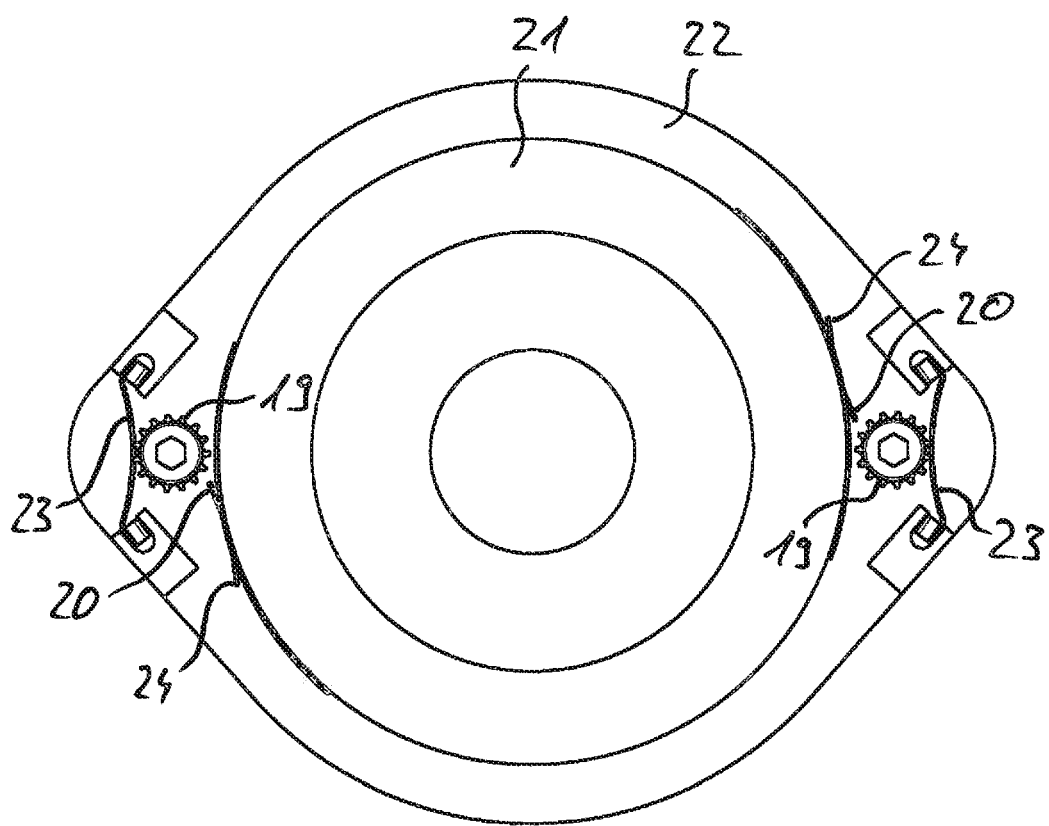
Figure 10:
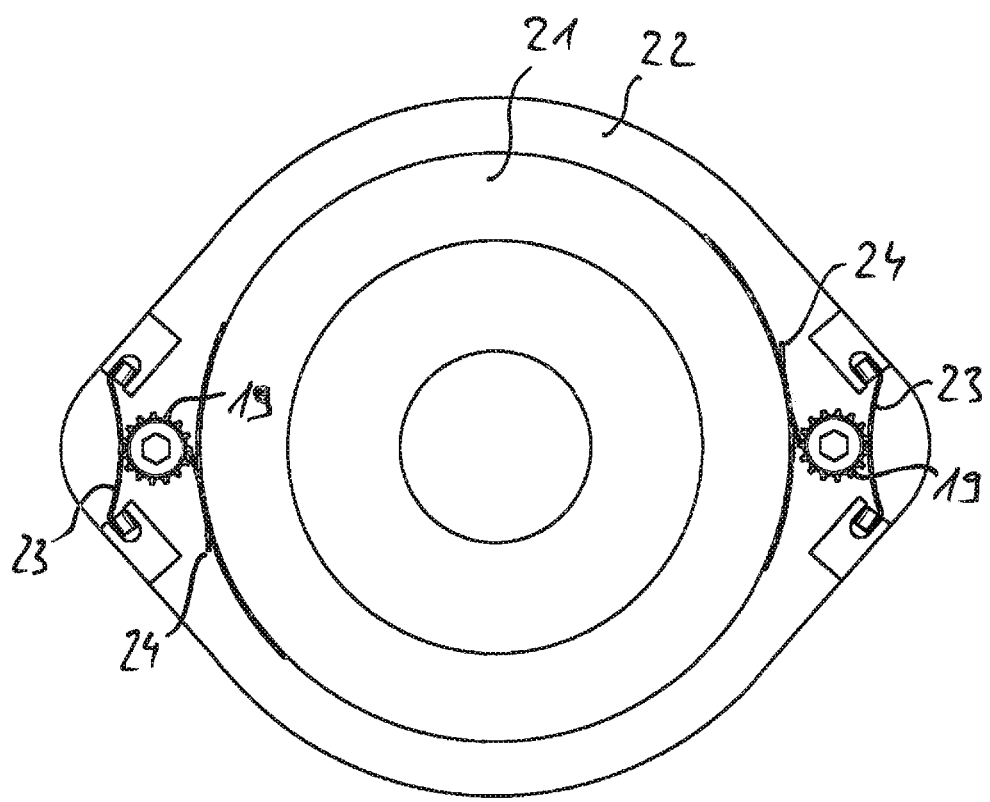
Figure 11:
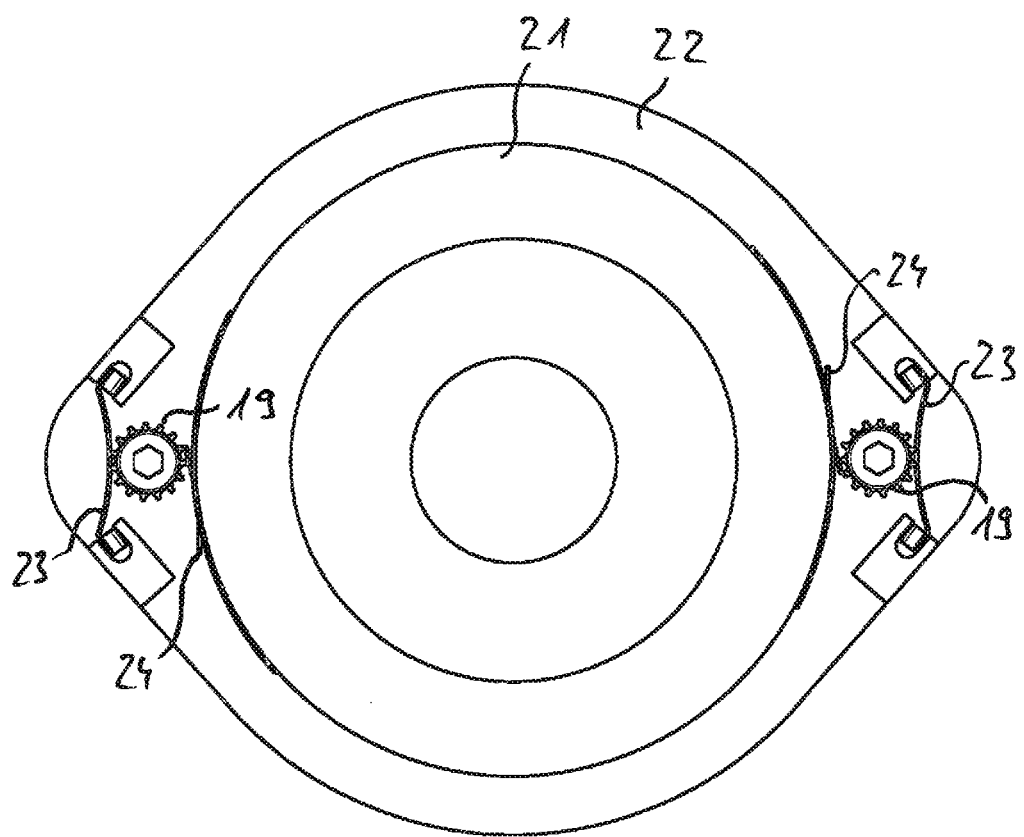
Figure 12:
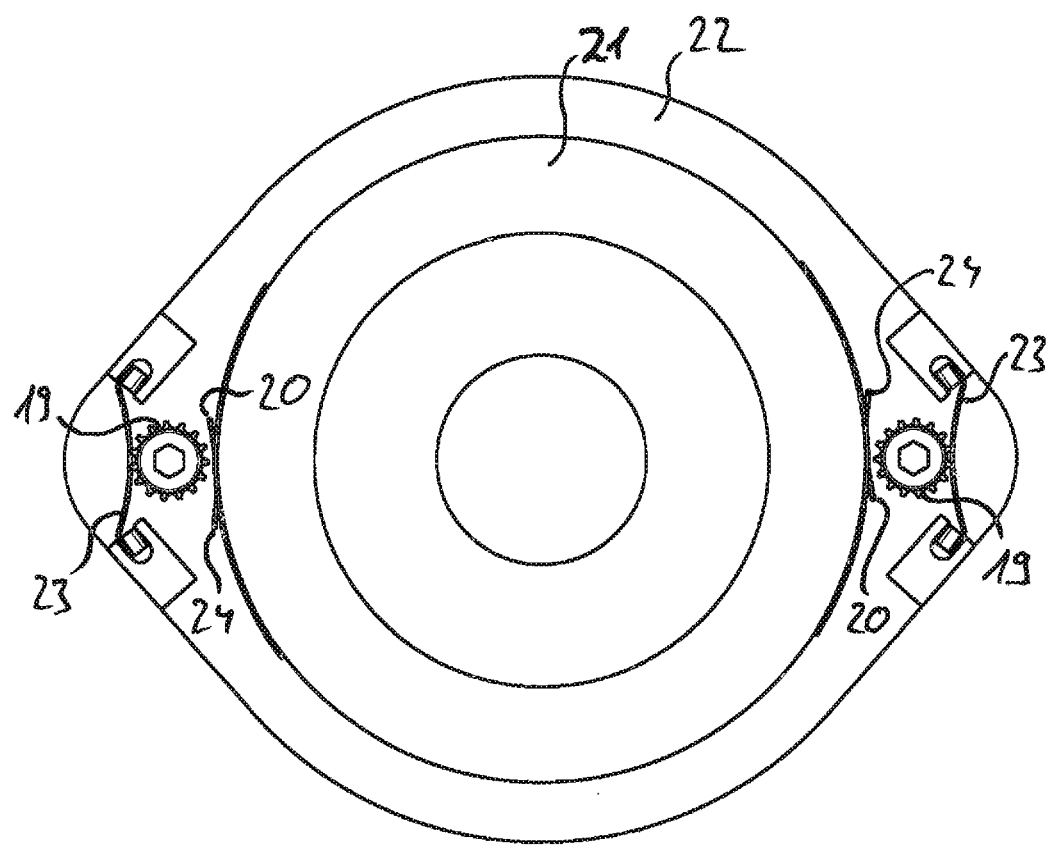

A position of the rotating part 21 shown in FIG. 9 corresponds to a completely released state of the electro-mechanical brake. For activating the brake, the rotating part 21 is, together with the rotating plate 16 of the ball ramp mechanism, rotated in the reverse direction mentioned before, which is counterclockwise in FIG. 9, a maximum rotation of the rotating part 21 in this direction corresponding to an angular movement of not more than about 120°. Thus, the elastic arms 20 are arranged so that they do not engage with the pinions 19 of the pushing pins 6 if the rotating plate 16 and the rotating part 21 are rotated within an interval of rotation angles corresponding to a normal operation of the electro-mechanical brake.

The elastic arms 20 can, however, engage with the pinion 19 of the respective pushing pin 6 if the rotating part 21 is rotated in a range of rotation angles lying beyond a limit of the said interval in a direction of rotation corresponding to a release of the electro-mechanical brake. To be more precise, the elastic arms 20 are arranged to drive the pinions 19 and the rotary parts 18 of the pushing pins 6 for increasing the length of the pushing pins 6 if the elastic arms 20 are engaged with the pinions 19 and if the rotating plate 16 and rotating part 21 are rotated in the first direction, which is clockwise in FIG. 9. A corresponding motion of the rotating part 21 and the elastic arms 20 driving the pinions 19 is illustrated in FIGS. 9 to 12. This motion can be driven by the electric motor 7. So, the adjustment mechanism can be operated by rotating the said rotating part 21 beyond the limit of its usual interval of rotation angles using the electric motor 7. Being elastic, the elastic arms 20 are configured to slide over the pinions 19 of the pushing pins 6 without rotating the rotary parts 18 of the pushing pins 6 during a rotation of the rotating part in the said reverse direction, even if the elastic arms are in contact with the pinions 19. So, from the position shown in FIG. 12, the rotating part 21 can be rotated back in the reverse direction towards its usual interval of rotation angles without undoing an adjustment made by the operation described and shown in FIGS. 9 to 12. To this end, the pinions 19 are hold in position by leaf springs 23.

In order to adjust the length of the pushing pins as required for compensating for the wear of the brake pads 3 and 4, the electro-mechanical brake comprises a position sensor, which preferably is integrated in the electric motor 7, for detecting a position of the electric motor and of the first transmission. Furthermore, the electro-mechanical brake comprises a control unit (not shown) for controlling the electric motor 7 to drive the second transmission, i.e. the adjustment mechanism. The control unit is configured for determining a free play of the electro-mechanical brake due to an increased wear of the brake pads 3 and 4 how an output torque and a power consumption of the electric motor changes with the position detected by the position sensor. The control unit is further configured for controlling the electric motor 7 to drive the second transmission so that the length of the pushing pins 6 is increased and the free play is reduced to compensate for the increased wear if the determined free play is larger than a given threshold value. If need be, the electric motor 6 can be controlled to alternately drive the first transmission in opposite directions so that the rotating part 21 performs a reciprocating motion between the positions shown in FIG. 9 and FIG. 12 so that the second transmission of the adjustment mechanism is driven to increase the length of the pushing pins 6 to a value adapted to the reduced thickness of the worn brake pads 3 and 4.

In addition to the elastic arms 20, the adjustment mechanism comprises further elastic arms 24 arranged at the outer rim of the rotating part 21, one for each of the pushing pins 6, to engage with the pinions 19. The further elastic arms 24 are also arranged so that they do not engage with the pinions 19 of the pushing pins 6 if the rotating part 21 is rotated within the said interval of rotation angles corresponding to the normal operation of the electro-mechanical brake either. They may engage with the pinions 19 if the rotating part 21 is rotated in the said range of rotation angles lying beyond the said limit of the usual interval of rotation angles. To be more precise, the further elastic arms 24 are arranged to drive pinions 19 and the rotary parts 18 of the pushing pins for reducing the length of the pushing pins if the further elastic arms 24 are engaged with the pinions 19 of the pushing pins 6 and if the rotating part 21 is rotated in the said reverse direction. A corresponding motion of the rotating part 21, the further elastic arms 24 and the pinions 19 is illustrated in FIGS. 13 to 15. The further elastic arms 24 are configured to slide over the pinions 19 without rotating them and the rotary parts 18 of the pushing pins if they contact the pinions 19 during a rotation of the rotating part 21 in the first direction. The further elastic arms 24 are used for reversing or undoing any adjustments made, as described before, to compensate for the pad wear, in particular if a used and worn brake pad 3 or 4 is replaced with a corresponding new brake pad 3 or 4, respectively. To this end, the motion illustrated in FIGS. 13 to 15 can be repeated as often as necessary. Of course, the reversing or undoing of the earlier adjustments can also be made by means of the same electric motor 6. Then, the electric motor 6 is controlled to alternately drive the first transmission 21 in opposite directions so that the rotating part 21 performs a reciprocating motion between the positions shown in FIG. 13 and FIG. 15 and that, thereby, the second transmission is driven to reset the adjustment mechanism by reducing the length of the pushing pins 6 to a value adapted to the unworn and, thus, thicker new brake pads 3 and 4.

The invention claimed is:

1. An electro-mechanical brake with an actuator for pressing at least one brake pad against a rotating friction surface, the actuator comprising:
   an electric motor;
   a first transmission for converting a rotary motion of the electric motor into a translational motion of the at least one brake pad for activating or releasing the electro-mechanical brake;
   a second transmission for converting a rotary motion of the same electric motor into a further translational motion of the at least one brake pad to compensate for a wear of the at least one brake pad, the first transmission and the second transmission being coupled so that the translational motion of the at least one brake pad caused by the first transmission and the further translational motion of the at least one brake pad caused by the second transmission add up to a resulting translation of the at least one brake pad,
   wherein the second transmission comprises:
   at least two pushing pins configured to push against the at least one brake pad, wherein the first transmission is configured to convert a rotary motion of the electric motor into a translational motion of the pushing pins and the second transmission is configured to adjust a variable length of the pushing pins to the wear of the at least one brake pad;
   a mechanism configured to convert a rotational motion of a rotary part of each of the pushing pins into a length variation of the pushing pins; and
   at least one elastic arm arranged at an outer rim of a rotating part of the first transmission to engage with a pinion provided at the rotary part of at least one of the pushing pins.

2. The electro-mechanical brake of claim 1, wherein each of the pushing pins is provided with a pinion at its rotary part and that the adjustment mechanism comprises an elastic arm for each of the pushing pins, the elastic arms being arranged at the outer rim of the rotating part of the first transmission to engage with the pinion of the respective pushing pin.

3. The electro-mechanical brake of claim 1, wherein the elastic arm is arranged so that it does not engage with the pinion of the respective pushing pin or with any of the pinions of the pushing pins if the said rotating part is rotated within an interval of rotation angles corresponding to a normal operation of the electro-mechanical brake.

4. The electro-mechanical brake of claim 3, wherein the elastic arm is arranged so that it may engage with the pinion of the respective pushing pin if the rotating part is rotated in a range of rotation angles lying beyond a limit of the said interval in a direction of rotation corresponding to a release of the electro-mechanical brake.

5. The electro-mechanical brake of claim 1, wherein the elastic arm is arranged to drive the rotary part of the respective pushing pin for increasing the length of the pushing pin if the elastic arm is engaged with the pinion of the pushing pin and if the rotating part of the first transmission is rotated in a first direction, while the elastic arm is configured to slide over the pinion of the pushing pin without rotating the rotary part of the pushing pin if the elastic arm contacts the pinion during a rotation of the rotating part in a reverse direction.

6. The electro-mechanical brake of claim 5, wherein the first direction is the direction of rotation of the rotating part corresponding to a release of the electro-mechanical brake, while the reverse direction is a direction of rotation of the rotating part corresponding to an activation of the electro-mechanical brake.

7. The electro-mechanical brake of claim 5, wherein that the adjustment mechanism comprises at least one further elastic arm arranged at the outer rim of the said rotating part of the first transmission to engage with the pinion provided at the rotary part of at least one of the pushing pins, the further elastic arm being arranged so that it does not engage with the pinion of the respective pushing pin or with any of the pinions of the pushing pins if the said rotating part is rotated within the said interval of rotation angles corresponding to the normal operation of the electro-mechanical brake, while it may engage with the pinion of the respective pushing pin if the rotating part is rotated in the said range of rotation angles lying beyond the said limit of the said interval, wherein the further elastic arm is arranged to drive the rotary part of the respective pushing pin for reducing the length of the pushing pin if the further elastic arm is engaged with the pinion of the pushing pin and if the rotating part of the first transmission is rotated in the said reverse direction, while the further elastic arm is configured to slide over the pinion of the pushing pin without rotating the rotary part of the pushing pin if it contacts the pinion during a rotation of the rotating part in the first direction.

8. The electro-mechanical brake of claim 1, wherein each of the pushing pins has a screw thread as a constituent of the adjustment mechanism, one of a nut and a lead screw of the screw thread being given by or part of the said rotary part of the pushing pin.

9. The electro-mechanical brake of claim 1, wherein the first transmission comprises a reduction gear for converting a rotational speed of a shaft of the electric motor and/or a ball ramp mechanism for converting an output of the electric motor or of the reduction gear into the translational motion.

10. The electro-mechanical brake of claim 9, wherein the reduction gear comprises a toothed belt drive and/or a planetary gear.

11. An electro-mechanical brake with an actuator for pressing at least one brake pad against a rotating friction surface, the actuator comprising:
- an electric motor;
- a first transmission for converting a rotary motion of the electric motor into a translational motion of the at least one brake pad for activating or releasing the electro-mechanical brake;
- a second transmission for converting a rotary motion of the same electric motor into a further translational motion of the at least one brake pad to compensate for a wear of the at least one brake pad, the first transmission and the second transmission being coupled so that the translational motion of the at least one brake pad caused by the first transmission and the further translational motion of the at least one brake pad caused by the second transmission add up to a resulting translation of the at least one brake pad;
- at least two pushing pins configured to push against the at least one brake pad, wherein the first transmission is configured to convert a rotary motion of the electric motor into a translational motion of the pushing pins and the second transmission is configured to adjust a variable length of the pushing pins to the wear of the at least one brake pad,
- wherein the first transmission comprises a reduction gear for converting a rotational speed of a shaft of the electric motor and/or a ball ramp mechanism for converting an output of the electric motor or of the reduction gear into the translational motion, and
- wherein the ball ramp mechanism comprises a fixed plate, a rotating plate and balls arranged between the fixed plate and the rotating plate for rolling in ramp grooves provided in a surface of the fixed plate and in a surface of the rotating plate, a rotating part being identical with or connected to the rotating plate of the ball ramp mechanism.

12. The electro-mechanical brake of claim 1, further comprising:
- a position sensor for detecting a position of the electric motor and/or of the first transmission; and
- a control unit for controlling the electric motor to drive the second transmission, wherein the control unit is configured for:
- determining a free play of the electro-mechanical brake by detecting a dependence between an output torque and/or a power consumption of the electric motor and the position detected by the position sensor; and
- driving the second transmission for reducing the free play if the determined free play is larger than a given threshold value.

* * * * *